United States Patent
Brothers

(10) Patent No.: US 11,373,097 B2
(45) Date of Patent: *Jun. 28, 2022

(54) OPTIMIZED NEURAL NETWORK INPUT STRIDE METHOD AND APPARATUS

(71) Applicant: Samsung Electronics Co., Ltd., Suwon-si (KR)

(72) Inventor: John Wakefield Brothers, Calistoga, CA (US)

(73) Assignee: SAMSUNG ELECTRONICS CO., LTD.

(*) Notice: Subject to any disclaimer, the term of this patent is extended or adjusted under 35 U.S.C. 154(b) by 0 days.

This patent is subject to a terminal disclaimer.

(21) Appl. No.: 16/929,087

(22) Filed: Jul. 14, 2020

(65) Prior Publication Data

US 2020/0349432 A1 Nov. 5, 2020

Related U.S. Application Data

(63) Continuation of application No. 15/672,279, filed on Aug. 8, 2017, now Pat. No. 10,776,694.

(Continued)

(51) Int. Cl.
| | |
|---|---|
| *G06N 3/08* | (2006.01) |
| *G06F 17/15* | (2006.01) |
| *G06N 3/04* | (2006.01) |
| *G06N 20/00* | (2019.01) |
| *G06T 7/00* | (2017.01) |
| *G06N 3/063* | (2006.01) |

(52) U.S. Cl.
CPC ............ *G06N 3/08* (2013.01); *G06F 17/153* (2013.01); *G06N 3/04* (2013.01); *G06N 3/0454* (2013.01); *G06N 20/00* (2019.01); *G06N 3/063* (2013.01); *G06T 7/00* (2013.01)

(58) Field of Classification Search
CPC ....................................................... G06F 17/153
See application file for complete search history.

(56) References Cited

U.S. PATENT DOCUMENTS 9,373,059 B1 6/2016 Heifets et al.
10,776,694 B2 * 9/2020 Brothers .............. G06N 3/0454
(Continued)

OTHER PUBLICATIONS

Notice of Allowance for U.S. Appl. No. 15/672,279, dated May 11, 2020.

*Primary Examiner* — Chuong D Ngo
(74) *Attorney, Agent, or Firm* — Renaissance IP Law Group LLP

(57) ABSTRACT

A convolutional layer in a convolutional neural network uses a predetermined horizontal input stride and a predetermined vertical input stride that are greater than 1 while the hardware forming the convolutional layer operates using an input stride of 1. Each original weight kernel of a plurality of sets of original weight kernels is subdivided based on the predetermined horizontal and vertical input strides to form a set of a plurality of sub-kernels for each set of original weight kernels. Each of a plurality of IFMs is subdivided based on the predetermined horizontal and vertical input strides to form a plurality of sub-maps. Each sub-map is convolved by the corresponding sub-kernel for a set of original weight kernels using an input stride of 1. A convolved result of each sub-map and the corresponding sub-kernel is summed to form an output feature map.

17 Claims, 6 Drawing Sheets

Related U.S. Application Data

(60) Provisional application No. 62/507,209, filed on May 16, 2017.

(56) References Cited

U.S. PATENT DOCUMENTS

| | | | |
|---|---|---|---|
| 2016/0062947 A1 | 3/2016 | Chetlur et al. | |
| 2017/0032222 A1 | 2/2017 | Sharma et al. | |
| 2017/0039436 A1 | 2/2017 | Chen et al. | |
| 2018/0018554 A1* | 1/2018 | Young | G06N 3/084 |
| 2018/0032857 A1* | 2/2018 | Lele | G06N 3/04 |
| 2018/0315155 A1 | 11/2018 | Park et al. | |
| 2018/0322607 A1 | 11/2018 | Mellempudi et al. | |

* cited by examiner

OPTIMIZED NEURAL NETWORK INPUT STRIDE METHOD AND APPARATUS

CROSS-REFERENCE TO RELATED APPLICATION

This application is a continuation of U.S. patent application Ser. No. 15/672,279, filed Aug. 8, 2017, which claims the priority benefit under 35 U.S.C. § 119(e) of U.S. Provisional Patent Application Ser. No. 62/507,209, filed on May 16, 2017, the disclosures of which are incorporated herein by reference in their entirety.

TECHNICAL FIELD

The subject matter disclosed herein generally relates to convolutional neural networks (CNNs), and more particularly, to an apparatus and method that provides a convolutional layer using an input stride that is greater than 1 while the hardware performing the convolutional layer operates using an input stride of 1.

BACKGROUND

Convolutional layers in a CNN may be used to extract features from an input image, or input feature map (IFM), by sliding a convolution kernel across the IFM. That is, one or more IFMs may be input to a convolutional layer and may be convolved using one or more sets of different filter (weight) kernels. The results of the convolutions are summed to generate an output feature map (OFM). The OFMs may then be used as IFMs for a next convolutional layer, and features may be further extracted by sliding a different set of convolution kernels across the IFMs.

SUMMARY

An example embodiment provides a system to form at least one OFM from at least one IFM at a convolutional layer in a neural network in which the system may include a weight-kernel subdivider, an IFM subdivider, and a convolver. The weight-kernel subdivider may subdivide each original weight kernel of a plurality of sets of original weight kernels based on a predetermined horizontal input stride and a predetermined vertical input stride to form a set of a plurality of sub-kernels for each set of original weight kernels in which the plurality of sets of original weight kernels may correspond to a current convolutional layer of the neural network, the predetermined horizontal input stride may be greater than 1, and the predetermined vertical input stride may be greater than 1. The IFM subdivider may subdivide each of a plurality of IFMs based on the predetermined horizontal input stride and the predetermined vertical input stride to form a plurality of sub-maps for each IFM of the plurality of IFMs in which the plurality of IFMs may correspond to the current convolutional layer, and each sub-map may correspond to a sub-kernel in each set of the plurality of sub-kernels. The convolver may be coupled to the weight-kernel subdivider and the IFM subdivider and may convolve each sub-map by the corresponding sub-kernel for a set of original weight kernels using an input stride of 1 for each set of original weight kernels in which the convolver may further sum a convolved result of each sub-map and the corresponding sub-kernel to form an OFM corresponding to the set of original weight kernels for each set of original weight kernels. In one embodiment, a weight in a sub-kernel may include a weight in the original weight kernel from which the sub-kernel was subdivided based on a modulo of the predetermined horizontal input stride and based on a modulo of the predetermined vertical input stride of a position of the weight in the original weight kernel. In one embodiment, the predetermined horizontal input stride and the predetermined vertical input stride may be equal to a predetermined second value, and the weight-kernel subdivider may further subdivide each original weight kernel of a plurality of sets of original weight kernels by a square of the predetermined second value to form the set of a plurality of sub-kernels for each set of original weight kernels, and the IFM subdivider may further subdivide each of the plurality of IFMs based on the square of the predetermined second value to form the plurality of sub-maps for each IFM of the plurality of IFMs.

One example embodiment provides a system to form at least one OFM from at least one IFM at a convolutional layer in a neural network in which the system may include a weight-kernel subdivider, an IFM subdivider, and a convolver. The weight-kernel subdivider may increase a dimensionality of each set of a plurality of sets of original weight kernels by subdividing each original weight kernel based on a predetermined horizontal input stride and a predetermined vertical input stride to form a plurality of sub-kernels for each set of original weight kernels in which the plurality of sets of original weight kernels may correspond to a current convolutional layer of the neural network, a dimension of each sub-kernel may be less than a dimension of the original weight kernel from which the sub-kernel was subdivided, the predetermined horizontal input stride may be greater than 1, and the predetermined vertical input stride may be greater than 1. The IFM subdivider may increase a dimensionality of a plurality of IFMs by subdividing each IFM of the plurality of IFMs based on the predetermined horizontal input stride and the predetermined vertical input stride to form a plurality of sub-maps for each IFM in which the plurality of IFMs may correspond to the current convolutional layer, each sub-map may correspond to a sub-kernel in each set of the plurality of sub-kernels, and a dimension of each sub-map may be less than a dimension of the IFM was subdivided. The convolver may be coupled to the weight-kernel subdivider and the IFM subdivider, in which the convolver may convolve each sub-map by the corresponding sub-kernel for a set of original weight kernels using an input stride of 1 for each set of original weight kernels, and the convolver may further sum a convolved result of each sub-map and the corresponding sub-kernel to form an OFM corresponding to the set of original weight kernels for each set of original weight kernels. In one embodiment, the predetermined horizontal input stride and the predetermined vertical input stride may be equal to a predetermined second value, in which case the weight-kernel subdivider may further subdivide each original weight kernel of a plurality of sets of original weight kernels by a square of the predetermined second value to form the set of a plurality of sub-kernels for each set of original weight kernels, and the IFM subdivider may further subdivide each of the plurality of IFMs based on the square of the predetermined second value to form the plurality of sub-maps for each IFM of the plurality of IFMs.

One example embodiment provides a method to form at least one OFM from at least one IFM at a convolutional layer in a neural network in which the method may include: subdividing each original weight kernel of a plurality of sets of original weight kernels based on a predetermined horizontal input stride and a predetermined vertical input stride to form a set of a plurality of sub-kernels for each original weight kernel in a set of original weight kernels in which the plurality of sets of original weight kernels may correspond to a current convolutional layer of the neural network, the predetermined horizontal input stride may be greater than 1, and the predetermined vertical input stride may be greater than 1; subdividing each of a plurality of IFMs based on the predetermined horizontal input stride and the predetermined vertical input stride to form a plurality of sub-maps for each IFM of the plurality of IFMs in which the plurality of IFMs may correspond to the current convolutional layer, and each sub-map may correspond to a sub-kernel in each set of the plurality of sub-kernels; for each set of original weight kernels, convolving each sub-map by the corresponding sub-kernel using a horizontal input stride of 1 and a vertical input stride of 1; and for each set of original weight kernels, summing a convolved result of each sub-map and the corresponding sub-kernel to form an OFM corresponding to the set of original weight kernels. In one embodiment, the predetermined horizontal input stride and the predetermined vertical input stride may be equal to a predetermined first value, in which case subdividing each original weight kernel of a plurality of sets of original weight kernels may include subdividing each original weight kernel of a plurality of sets of original weight kernels by a square of the predetermined first value to form the set of a plurality of sub-kernels for each set of original weight kernels, and subdividing each of a plurality of IFMs may include subdividing each of the plurality of IFMs based on the square of the predetermined first value to form the plurality of sub-maps for each IFM of the plurality of IFMs.

BRIEF DESCRIPTION OF THE DRAWINGS

In the following section, the aspects of the subject matter disclosed herein will be described with reference to exemplary embodiments illustrated in the figures, in which.

DETAILED DESCRIPTION

Figure 1:
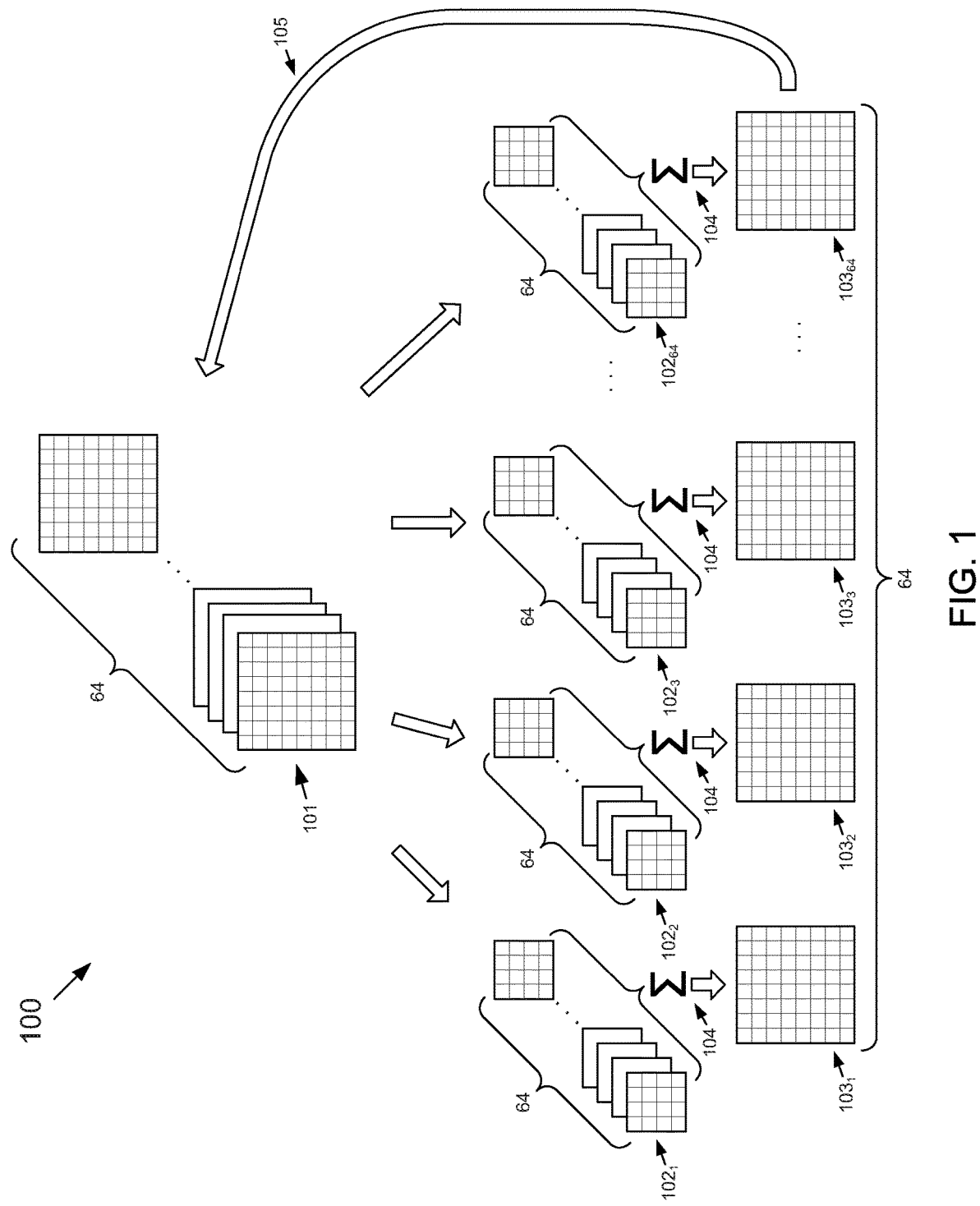
FIG. 1 depicts a general processing flow within one example convolutional layer of a CNN according to the subject matter disclosed herein.

In the following detailed description, numerous specific details are set forth in order to provide a thorough understanding of the disclosure. It will be understood, however, by those skilled in the art that the disclosed aspects may be practiced without these specific details. In other instances, well-known methods, procedures, components and circuits have not been described in detail not to obscure the subject matter disclosed herein.

Reference throughout this specification to "one embodiment" or "an embodiment" means that a particular feature, structure, or characteristic described in connection with the embodiment may be included in at least one embodiment disclosed herein. Thus, the appearances of the phrases "in one embodiment" or "in an embodiment" or "according to one embodiment" (or other phrases having similar import) in various places throughout this specification may not be necessarily all referring to the same embodiment. Furthermore, the particular features, structures or characteristics may be combined in any suitable manner in one or more embodiments. In this regard, as used herein, the word "exemplary" means "serving as an example, instance, or illustration." Any embodiment described herein as "exemplary" is not to be construed as necessarily preferred or advantageous over other embodiments. Also, depending on the context of discussion herein, a singular term may include the corresponding plural forms and a plural term may include the corresponding singular form. It is further noted that various figures (including component diagrams) shown and discussed herein are for illustrative purpose only, and are not drawn to scale. Similarly, various waveforms and timing diagrams are shown for illustrative purpose only. For example, the dimensions of some of the elements may be exaggerated relative to other elements for clarity. Further, if considered appropriate, reference numerals have been repeated among the figures to indicate corresponding and/or analogous elements.

The terminology used herein is for the purpose of describing particular exemplary embodiments only and is not intended to be limiting of the claimed subject matter. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement the teachings of particular embodiments disclosed herein.

Unless otherwise defined, all terms (including technical and scientific terms) used herein have the same meaning as commonly understood by one of ordinary skill in the art to which this subject matter belongs. For example, the term "mod" as used herein means "modulo." It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "module" refers to any combination of software, firmware and/or hardware configured to provide the functionality described herein in connection with a module. The term "software," as applied to any implementation described herein, may be embodied as a software package, code and/or instruction set or instructions. The term "hardware," as applied to any implementation described herein, may include, for example, singly or in any combination, hardwired circuitry, programmable circuitry, state-machine circuitry, and/or firmware that stores instructions executed by programmable circuitry. The modules may, collectively or individually, be embodied as software, firmware and/or hardware that forms part of a larger system, such as, but not limited to, an integrated circuit (IC), system on-chip (SoC) and so forth.

The subject matter disclosed herein provides a system that optimally supports arbitrarily sized input strides with an accompanying reduced hardware cost and complexity. Convolutional operations may be performed using an input stride that is greater than 1, although the system hardware operates using an input stride of 1. The system disclosed herein provides an advantage of reducing the dimensions of the convolution kernel by forming multiple sub-kernels that make practical the use of a specially optimized Winograd convolution algorithm, and thereby reducing the computation needed to apply filter kernels to input maps.

One embodiment disclosed herein includes a hardware configuration that performs the special formatting on OFMs at the output of one convolutional layer to form IFMs that are input to the next convolutional layer if the next convolutional layer uses an input stride that is greater than 1. That is, if the next convolutional layer uses an input stride n that is greater than 1, an OFM output from the previous layer may be formatted to generate $n^2$ reduced-resolution maps and $n^2$ reduced resolution kernels.

FIG. 1 depicts a general processing flow within one example convolutional layer 100 of a CNN according to the subject matter disclosed herein. A plurality of IFMs 101 is processed with one or more sets of corresponding weight kernels 102 to form a plurality of OFMs 103. The OFMs 103 may then be used as IFMs for the next convolutional layer (not shown) of the CNN.

As depicted in FIG. 1, there may be, for example, 64 IFMs 101 that are input to the convolutional layer 100. The 64 IFMs are convolved with 64 sets of kernels $102_1$-$102_{64}$ to form 64 OFMs $103_1$-$103_{64}$. The input feature elements of an IFM 101 are convolved with the weights of each of the 64 kernels 102 in a corresponding set of kernels, and each of the 64 results are summed to form a single OFM 103, as indicated at 104. That is, the input feature elements in each OFM 101 are convolved with the weights of a corresponding kernel 102 in a given set of kernels 102. For a given set of kernels 102, all of the results of the convolutional operations corresponding to the same position in the IFMs 101 are summed to form a single OFM 103. The OFMs 103 that have been generated may be used, as indicated at 105, as IFMs for the next convolutional layer (not shown).

Convolutions may be formed at a convolutional layer by stepping, or striding, different kernels across the IFMs in one unit of an X-dimension and in one unit of a Y-dimension. If a kernel is stepped by one unit in each of the horizontal (X-dimension) and the vertical (Y-dimension), the stepping is referred to as an "input stride" of 1. Input strides of 2 or 3 are also common, and it is possible to have even larger strides. Normally, the horizontal and vertical input strides are the same, although this is not necessary, because it is possible to have different stride sizes for the X-dimension and the Y-dimension.

Input strides greater than one may be used to reduce computation and dimensionality of OFMs. For example, for an input stride of 2, the output of a convolutional layer will be reduced to approximately a quarter of the input resolution and, therefore, only a quarter of the convolutional operations will be needed to generate an OFM.

For a given output rate, input data may be processed at four times the normal rate for an input stride of 2 in comparison to an input stride of 1 (i.e., the normal rate), and nine times the normal rate for an input stride of 3. A proportionally larger input region is accordingly used to generate a given number of output values (i.e., a given output rate). For example, to generate a 4×4 of output map values by applying a 3×3 convolution kernel using an input stride of 2, an input map region of 10×10 would be needed in contrast to an input map region of 5×5 for an input stride of 1.

An input stride that is greater than 1 may also be used to reduce the dimensionality of large weight kernels, such as a 7×7 kernel by using an input stride of 2, or a 5×5 kernel by using an input stride of 2. The receptive field of a large filter kernel will be correspondingly large and applying the filter kernel at a lower resolution (i.e., using an input stride greater than 1) may adequately reduce the receptive field of the kernel. Additionally, the cost of applying a kernel may be proportional to the kernel size, for example, a 7×7 kernel involves 49 multiplies and a 5×5 kernel involves takes 25 multiplies as compared to 9 multiplies for a 3×3 kernel. Thus, the cost of applying a kernel is reduced by applying the kernel more sparsely.

Additionally, by reducing the dimensionality of an IFM and of corresponding kernels, a Winograd algorithm may be used for applying convolutions thereby optimizing the number of multiplies required for a convolutional operation, although it should be noted that transformation to and from the Winograd domain may include some overhead. If a kernel is large, the transformation overhead associated with the Winograd algorithm for large kernels may overwhelm the multiply savings that may be obtained. In contrast, however, using the Winograd algorithm for 3×3 kernels may be convenient and efficient in comparison to using the Winograd algorithm for 5×5 and 7×7 kernels, particularly if the input stride is greater than 1. By subdividing an IFM maps and kernels into sub-maps and sub-kernels, 5×5 kernels may be converted into, for example, 3×3, 3×2, 2×3, and 2×2 sub-kernels using an input stride of 1, which can be efficiently implemented with the Winograd algorithm. Larger kernels, such as 7×7 kernels, may also be subdivided and then processed using an input stride of 1 as described herein.

One embodiment disclosed herein provides a system in which OFM data at one convolutional layer may be specially formatted on-the-fly as part of the processing of that convolutional layer if the next convolutional layer uses an input stride that is greater than 1 and even though the hardware for the convolutional operation of the next layer may be configured for an input stride of 1. In one embodiment, the special formatting may be provided by subsampling hardware. For example, if the next convolutional layer uses an input stride is 2, the OFM of the current convolutional layer may be subdivided based on the input stride of the next convolutional layer. That is, the OFM of the current convolutional layer may be subdivided by the square of the input stride of the next convolutional layer to form, in the case of an input stride of 2 at the next convolutional layer, four input feature sub-maps.

One input feature sub-map would be formed to include all elements corresponding to even X-even Y positions of the undivided OFM. Another sub-map would be formed to include all elements corresponding to the even X-odd Y positions of the undivided OFM. Still another sub-map would be formed to include all elements corresponding to the odd X-even Y positions of the undivided OFM, and a last sub-map would be formed to include all elements corresponding to the odd X-odd Y positions of the undivided OFM. Although there would be four times as many IFMs, the same number of write operations would be used to write the OFM data as the reformatted IFM data that would normally be used without the special sub-sampling formatting.

In addition to the special on-the-fly reformatting of the output data of one convolutional layer in prior to, or advance, of a strided convolutional operation in a next layer, weight kernels associated with the next convolutional layer are also reformatted, or subdivided, based on the input stride of the next convolutional layer. In the case of an example input stride of 2, the kernels may be subdivided in to quarters to form four sub-kernels.

For an example input stride of 2 and for convolutional operations using 5×5 kernels, one sub-kernel would be formed to include all weights corresponding to even X-even Y positions of the original, un-subdivided kernel (i.e., the parent kernel). Another sub-kernel would be formed to include all weights corresponding to the even X-odd Y positions of the parent kernel. Still another sub-kernel would be formed to include all weights corresponding to the odd X-even Y position of the parent kernel, and a last sub-kernel would be formed to include all weights corresponding to the odd X-odd Y positions of the parent kernel. The sub-kernels may be used in a convolutional operation in a manner that is similar to how the larger kernels would have been used prior to being subdivided based on an input stride that is greater than 1.

At execution time, each of the sub-kernels may be applied to one of four sub-maps that were formed as part of the special formatting of the OFM of the previous convolutional layer. The sub-kernel that includes all weights corresponding to the even X-even Y positions is applied to the input feature sub-map that includes all even X-even Y elements. The sub-kernel that includes all weights corresponding to the odd X-even Y positions is applied to the input feature sub-map that includes all odd X-even Y elements. The sub-kernel that includes all weights corresponding to all even X-odd Y is applied to the input feature sub-map that includes all even X-odd Y elements. Lastly, the sub-kernel that includes all weights corresponding to odd X-odd Y positions is applied to the input feature sub-map that includes all odd X-odd Y elements. The results of each convolution are then summed. That is, the result of the even X-even Y convolution is summed with the result of the odd X-even Y convolution. This sum is then summed with the result of the even X-odd Y convolution, which is then summed with the result of the odd X-odd Y convolution.

Figure 2:
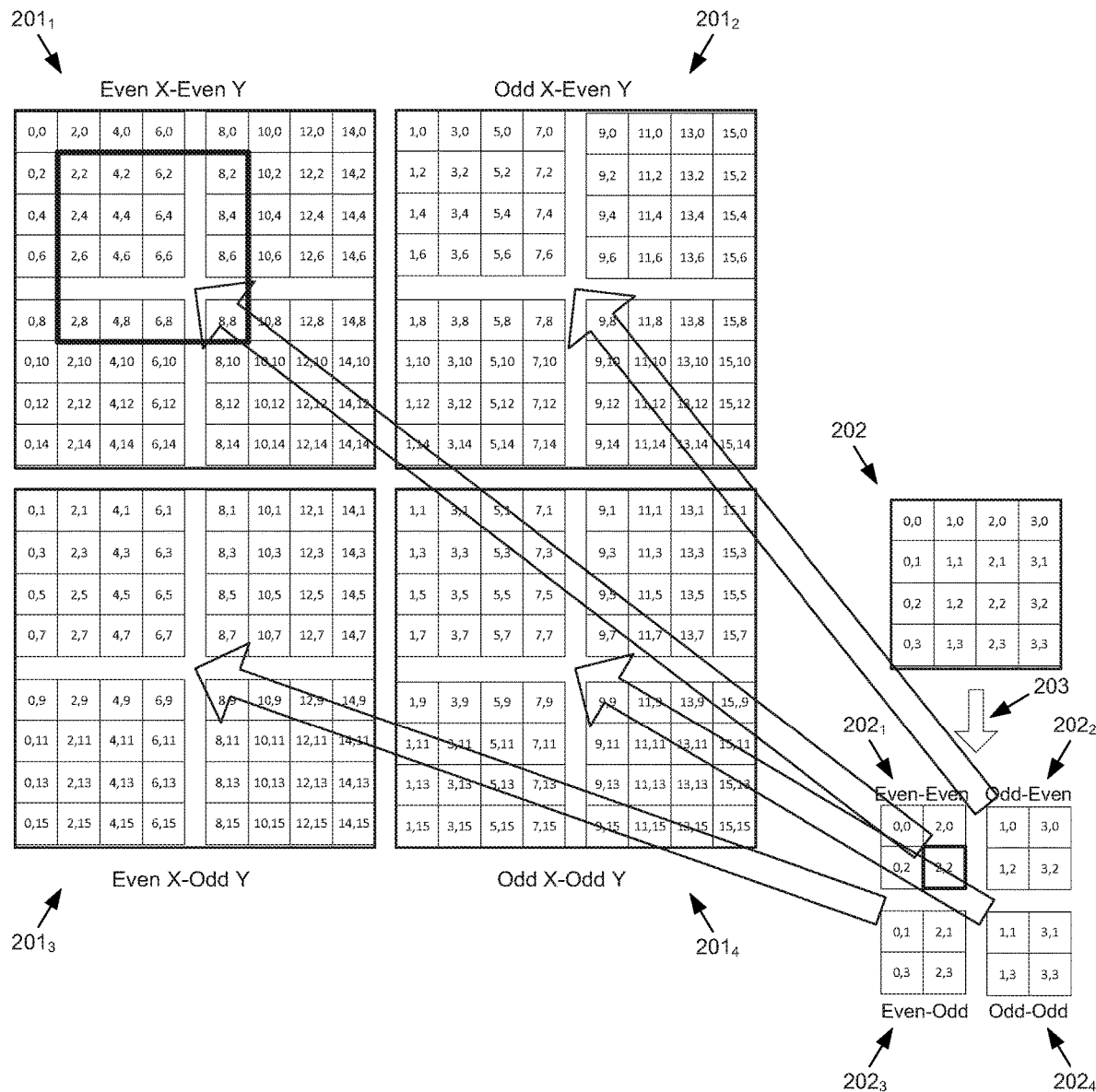
FIG. 2 depicts an example 16×16 OFM that has been sub-divided into four 8×8 input feature sub-maps for an example input stride of 2 at the next convolutional layer according to the subject matter disclosed herein.

FIG. 2 depicts an example 16×16 OFM that has been sub-divided into four 8×8 input feature sub-maps $201_1$-$201_4$ for an example input stride of 2 at the next convolutional layer according to the subject matter disclosed herein. Sub-map $201_1$ includes all elements corresponding to even X-even Y positions of the undivided OFM. Sub-map $201_2$ includes all elements corresponding to odd X-even Y positions of the undivided OFM. Sub-map $201_3$ includes all elements corresponding to even X-odd Y positions of the undivided OFM. Lastly, sub-map $201_4$ includes all elements corresponding to odd X-odd Y positions of the undivided OFM. The notation used in each position of the sub-maps $201_1$-$201_4$ represents the position of the element in the undivided 16×16 OFM.

FIG. 2 also depicts a corresponding example 4×4 kernel 202 that is to be applied to the 16×16 (un-subdivided) OFM at the next convolutional layer. The kernel 202 is sub-divided at 203 based on the input stride of 2 to form four 2×2 sub-kernels $202_1$-$202_4$. The sub-kernel $202_1$ includes all weights corresponding to the even X-even Y positions of the original kernel 202. The sub-kernel $202_2$ includes all weights corresponding to the odd X-even Y positions of the original kernel 202. The sub-kernel $202_3$ includes all weights corresponding to the even X-odd Y positions of the original kernel 202. Lastly, the sub-kernel $202_4$ includes all weights corresponding to the odd X-odd Y positions of the original kernel 202. The notation used in each position of the sub-kernels $202_1$-$202_4$ represents the position of the element in the undivided 4×4 kernel 202.

The sub-kernel $202_1$ is applied to the sub-map $201_1$. By way of illustrative example, the weight at position (2,2) in the sub-kernel $202_1$, which is surrounded by a relatively heavier line, is applied to the input elements in the even-even sub-map $201_1$ that are surrounded by a relatively heavier line. The sub-kernel $202_2$ is applied to the sub-map $201_2$. The sub-kernel $202_3$ is applied to the sub-map $201_3$, and the sub-kernel $202_4$ is applied to the sub-map $201_4$.

Figure 3:
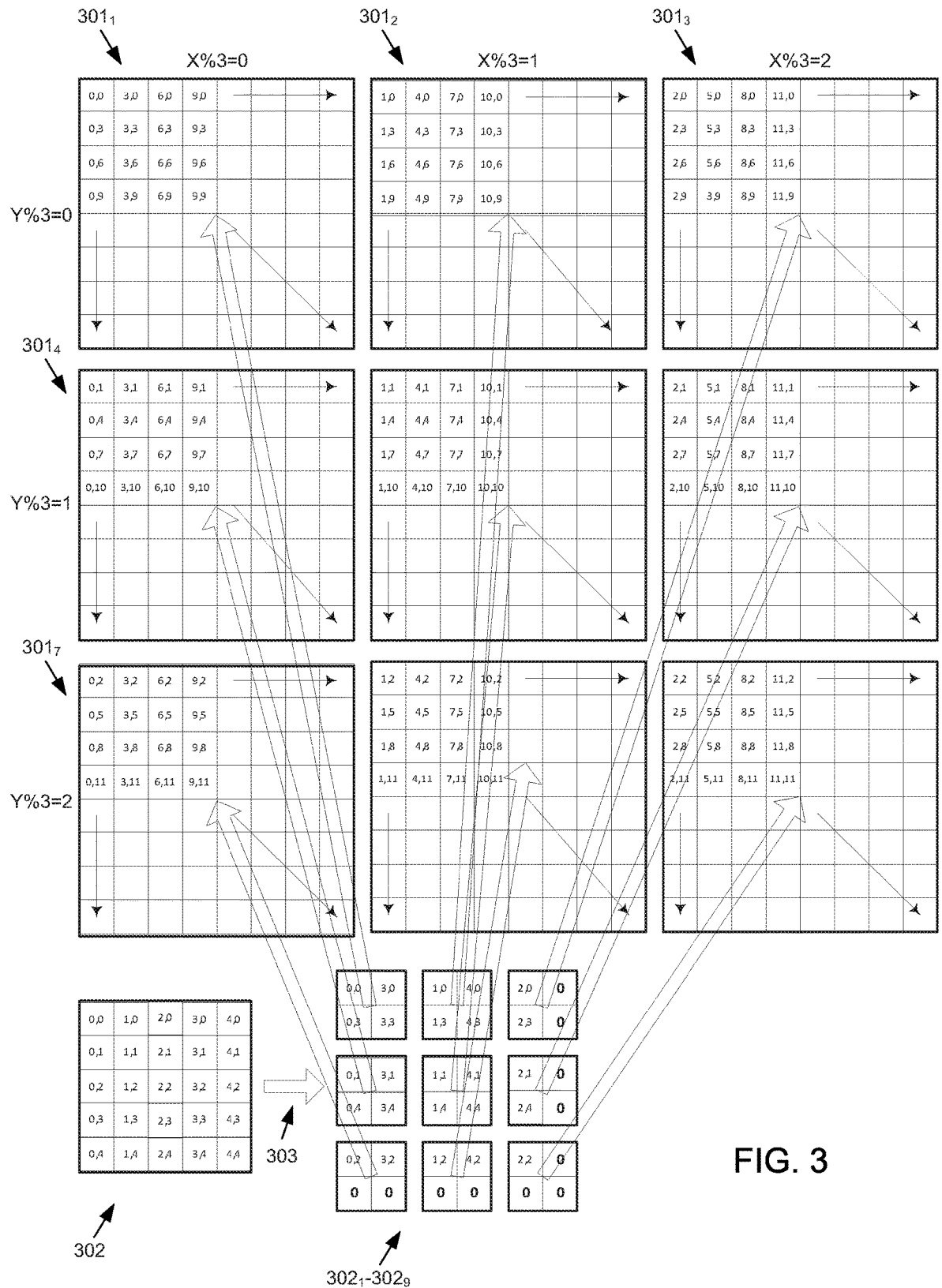
FIG. 3 depicts an example 24×24 OFM that has been sub-divided into nine 8×8 input feature sub-maps for an example input stride of 3 at the next convolutional layer according to the subject matter disclosed herein.

FIG. 3 depicts an example 24×24 OFM that has been sub-divided into nine 8×8 input feature sub-maps $301_1$-$301_9$ for an example input stride of 3 at the next convolutional layer according to the subject matter disclosed herein. It should be noted that for clarity of FIG. 3, only sub-maps $301_1$-$301_4$ and $301_7$ have been indicated. The sub-map $301_1$ includes all elements corresponding to X %3=0 and Y %3=0 positions of the undivided OFM. The sub-map $301_2$ includes all elements corresponding to X %3=1 and Y %3=0 positions of the undivided OFM. The sub-map $301_3$ includes all elements corresponding to X %3=2 and Y %3=0 positions of the undivided OFM. The sub-map $301_4$ includes all elements corresponding to X %3=0 and Y %3=1 positions of the undivided OFM. The sub-map $301_7$ includes all element corresponding to X %3=0 and Y %3=2 of the undivided OFM. The other sub-maps 301 not specifically indicated in FIG. 3 include elements based on modulo 3 positions of the undivided OFM. The notation used in each position of the sub-maps $301_1$-$301_9$ represents the position of the element in the undivided 16×16 OFM.

FIG. 3 also depicts a corresponding example 5×5 kernel 302 that is to be applied to the 16×16 OFM at the next convolutional layer. The 5×5 kernel 302 is sub-divided at 303 based on the input stride of 3 to form nine 2×2 sub-kernels $302_1$-$302_9$ in a manner similar to how the sub-kernels $202_1$-$202_4$ in FIG. 2 were formed, except that the weights of the sub-kernels $302_1$-$302_9$ are based on a modulo 3 position in the original kernel 302 as opposed to a modulo 2 position in the original kernel 202. The notation used in each position of the sub-kernels $302_1$-$302_9$ represents the position of the weight in the undivided 5×5 kernel 302. The sub-kernel $302_1$ is applied to the sub-map $301_1$. The sub-kernel $302_2$ is applied to the sub-map $301_2$. The sub-kernel $302_3$ is applied to the sub-map $301_3$, and so on.

In FIG. 2 with an input stride of 2, the strided convolution is decomposed into four quarter-sized convolutions of four quarter-sized input feature maps and summed. In FIG. 3 with an input stride of 3, nine sub-kernels would be applied to nine sub-maps, and summed. Thus, for an effective input stride of n, in which n is greater than 1, both an IFM and a corresponding weight kernel are divided by $n^2$ to form $n^2$ sub-kernels and $n^2$ sub-maps. In other words, the special formatting of an OFM to form an IFM increases the dimensionality of the OFMs (i.e., increases the number of OFMs), while decreasing the dimension of convolutional operation (i.e., reduces the size of the convolutional operation). The term "effective input stride," as used herein, refers to an input stride that is to be used at the next convolutional layer and that is greater than 1. The adjective "effective" is used to distinguish the operational input stride of a convolutional layer from the input stride of the hardware performing the convolutional operation, which is an input stride of 1.

In order to make an input stride that is greater than 1 appear to be transparent from the point of view of the hardware of a convolutional layer, particularly at hardware locations in which feature maps and weight kernels are fetched and input to convolutional operational units, one embodiment disclosed herein includes a hardware configuration that performs the special formatting on OFMs to form IFMs that are input to the next convolutional layer if the next convolutional layer uses an input stride that is greater than 1. That is, if the next convolutional layer uses an effective input stride n that is greater than 1, an OFM output from the previous layer may be formatted to generate $n^2$ reduced-resolution maps. The hardware is configured to physically operate using an input stride of 1; however, the special formatting arranges the OFM of a previous convolutional layer based on the effective input stride of the next convolutional layer. At the next convolutional layer, the convolutional hardware is driven as though the input stride is 1, which simplifies the hardware.

The special formatting based on the input stride that is used at the next layer reduces the resolution of both the IFMs and kernels, as depicted in FIGS. 2 and 3. The convolutional operation therefore appears to the system hardware to be no different than for any other set of IFMs and kernels in which the input stride is 1. Moreover, input buffering requirements are the same as for input stride of 1. The control and multiplexing logic may be the same as for a fixed input stride of 1 and, thus, is cost-optimized. Besides the reduced cost, the overall system design may be simplified because only one operating mode (i.e., an input stride of 1) may be used for fetching input data to apply to the convolutional computation logic.

Figure 4:
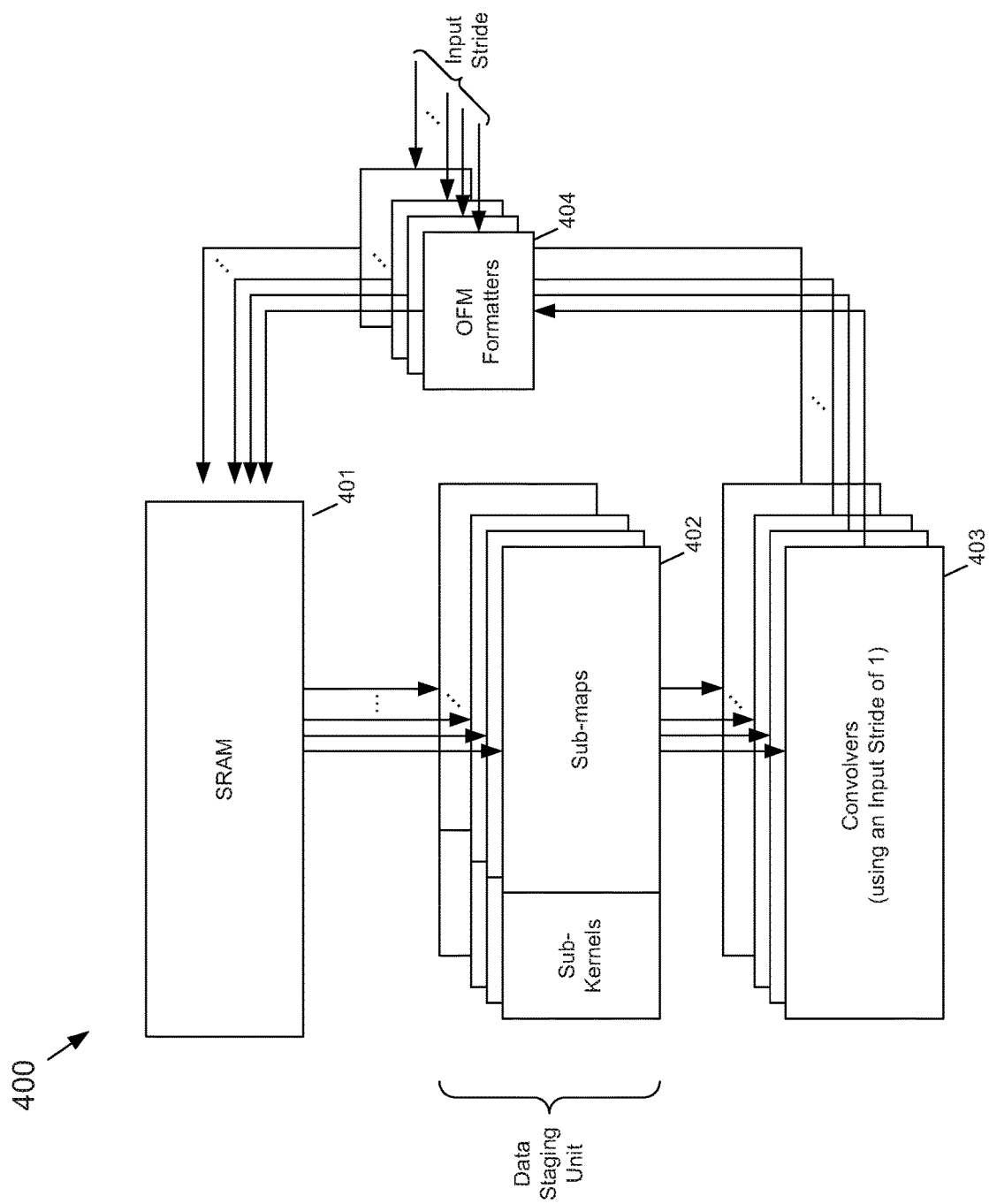
FIG. 4 depicts a functional block diagram of an example embodiment of a system that processes a convolutional layer of a CNN and that provides special formatting of OFMs output from the convolutional layer if the next layer uses an input stride that is greater than 1 according to the subject matter disclosed herein.

FIG. 4 depicts a functional block diagram of an example embodiment of a system 400 that processes a convolutional layer of a CNN and that provides special formatting of OFMs output from the convolutional layer if the next layer uses an input stride that is greater than 1 according to the subject matter disclosed herein. The system 400 includes a static random access memory (SRAM) 401, a plurality of data staging unit 402, a plurality of convolvers 403, and a plurality of OFM formatters 404. Each of the data staging units 402, the convolvers 403 and the OFM formatters 404 are configured to operate on a plurality of IFMs and a corresponding plurality of weight kernel sets in a parallel manner.

The SRAM 401 stores input data and weight kernel data. To process a convolutional layer, the input data, such as a plurality of IFMs, and the corresponding weight kernel data are transferred from the SRAM 401 to the data staging units 402. If the current convolutional layer uses an (effective) input stride that is greater than zero, the input data and the corresponding weight kernel data stored in the SRAM 401 would have been specially formatted based on the (effective) input stride so that the convolvers may operate using an input stride of 1. Additionally, if the current convolutional layer uses an (effective) input stride that is greater than 1, the IFMs and the weight kernels would be considered to be sub-maps and sub-kernels, as described above.

The special formatting of the weight kernel data may be performed offline as part of a series of network optimization steps done after training. In an alternative embodiment, the special formatting of the weight kernel data may be performed during runtime of the CNN. Further, if the kernels are sub-divided off-line, sub-kernels having weights that are all 0 may be identified and pruned. Sub-maps corresponding to sub-kernels having all 0s need not to be generated, thereby saving writes of the data to SRAM, eliminating the SRAM storage that would normally be required, and processing of that sub-map and the corresponding sub-kernel. For example, for an input stride of 2, if one sub-kernel includes all 0s, one-fourth of the convolutional processing and storage will be eliminated.

The data staging units 402 provide an alignment functionality to appropriately align an IFM (or sub-map) with non-zero weights of a corresponding weight kernel (or sub-kernel) in order to be able skip weights that have a zero value, and reduce the amount of processing performed in the convolvers 404. The convolvers generate convolutional results of the IFMs (or sub-maps) and the corresponding weight kernels (or sub-kernels) using an input stride of 1. If the next convolutional layer uses an (effective) input stride that is greater than zero, the (effective) input stride value is input to the OFM formatters 404, and the OFM output from the convolvers 403 is reformatted and stored in the SRAM 401 based on the next (effective) input stride, as described above. Accordingly, if the next convolutional layer uses an (effective) input stride of 1, the OFM formatters store the OFMs in the SRAM 401 based on an input stride of 1.

To process the next convolutional layer, the specially formatted IFMs (i.e., sub-maps) and the corresponding weight kernels (i.e., sub-kernels) are transferred from the SRAM 401 to the data staging units 402. The data staging units 402 align the feature data of the sub-maps and the sub-kernels. The convolvers generate convolutional results of the sub-maps and the corresponding sub-kernels using an input stride of 1. The process continues in the same manner to process all of convolutional layers.

To make completely transparent an input stride that is greater than 1 to the convolvers 403, each of the different alignments (even-even, odd-even, etc.) may be treated as a different IFM. For each of the input feature sub-maps, for example, four input feature sub-maps for an input stride of 2, as in the example above, there will also be a corresponding sub-kernel. A compiler may schedule the processing and assign memory addresses for the feature maps as needed to make one IFM appear as four quarter-sized IFMs, each with quarter-sized sub-kernel filters, so the IFMs always appear to be same to the processing units and will be processed as if the input stride is 1.

Figure 5:
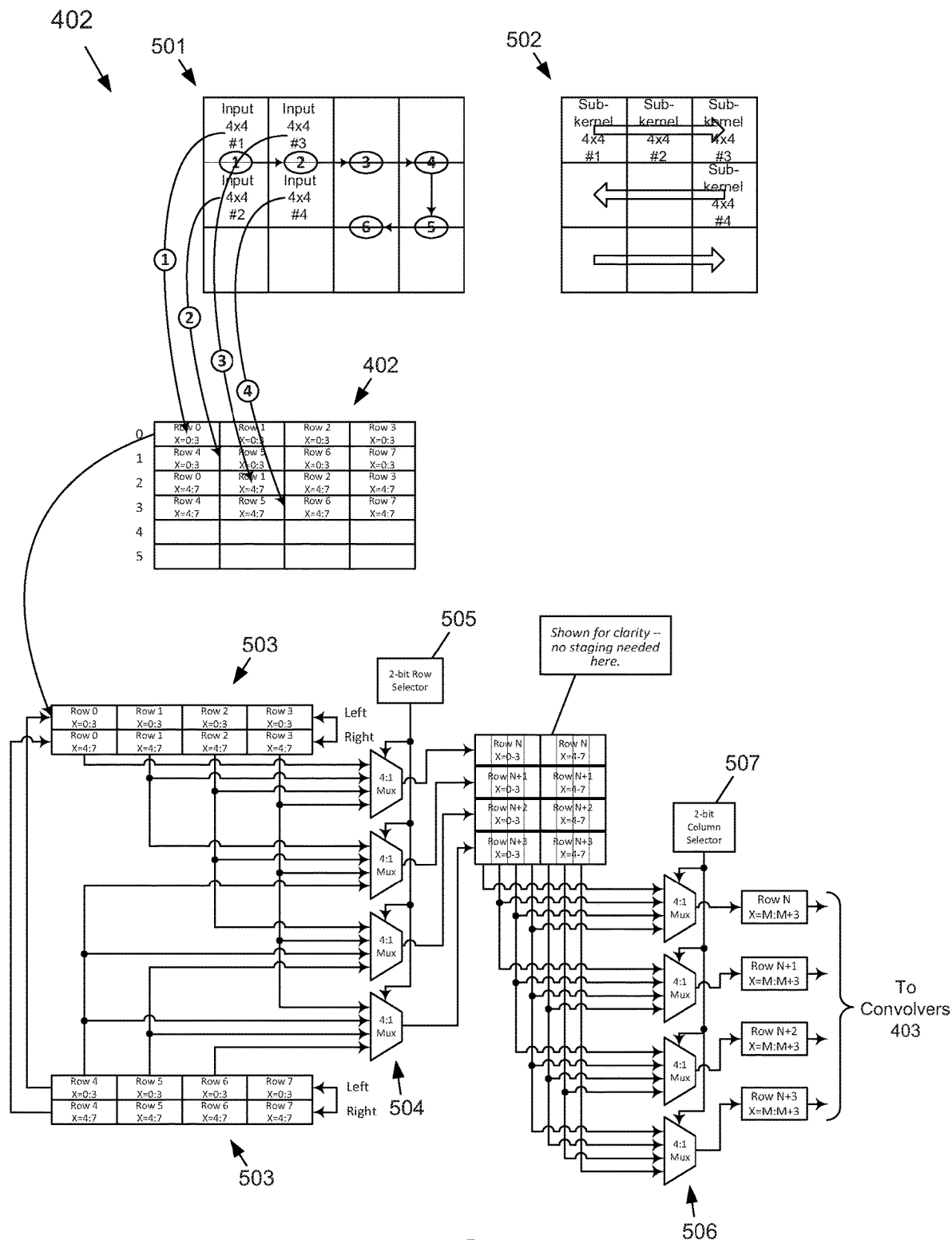
FIG. 5 depicts a functional block diagram of an example embodiment of a portion of a data staging unit according to the subject matter disclosed herein.

FIG. 5 depicts a functional block diagram of an example embodiment of a portion of a data staging unit 402 according to the subject matter disclosed herein. In FIG. 5, a single sub-map 501 is shown that is part of a specially formatted OFM from a previous convolutional layer. Other sub-maps that would be part of the specially formed OFM are not shown. For example, if the effective stride is 2, there would be three other sub-maps that are not shown. Also in FIG. 5, the original weight kernel has been subdivided to form a sub-kernel 502. The indicated 4×4s in the sub-map 501 are intended to indicate the pixels in the sub-map 501 to which the 4×4 parts of the sub-kernel are applied. Normally, a sub-kernel would be less than a single 4×4; however, for the example functional block diagram of FIG. 5, the kernel 502 is atypical, that is, the kernel 502 is a very large kernel. The processing depicted in FIG. 5 is normal processing for an IFM that supports stride-by-1. The 4×4s of the sub-maps 501 are read from the SRAM 401 in the order indicated in FIG. 5. Similarly, the 4×4 parts of the sub-kernel 502 are read from the SRAM 401 in the order indicated.

More specifically, the 4×4 pixels #1 of the sub-map 501 are transferred from a first row of registers in SRAM 401 to a first row of registers in an input buffer 503 in a data staging unit 402. The 4×4 pixels #2 of the sub-map 501 are transferred to a second row of registers of the input buffer 503. The 4×4 pixels #3 are transferred to a third row of registers of the input buffer 503, and the 4×4 pixels #4 are transferred to a fourth row of registers of the input buffer 503. A plurality of multiplexers 504 are driven by a two-bit row selector 505 and a plurality of multiplexers 506 are driven by a two-bit column selector 507 to select input feature data at positions that correspond to row positions of non-zero weights in the corresponding sub-kernel 502. That is, the positions of non-zero weights in the sub-kernels are determined and used to drive the two-bit row selector 505 and the two-bit column selector 507. The output of the multiplexers 506 is input to the convolvers 403 in FIG. 4. The lower part of FIG. 5 depicts one example embodiment of how the sub-map data is multiplexed out of the sub-map according to a non-zero kernel weight based on a hardware stride of 1. If the hardware stride was greater than 1, the multiplexing of the sub-map data would be significantly more complicated.

The various functional blocks depicted in FIGS. 4 and 5 may be embodied as modules formed from any combination of software, firmware and/or hardware that is configured to provide the functionality described in connection with the functional block. That is, the modules that may embody the functional blocks of FIGS. 4 and 5 may collectively or individually, be embodied as software, firmware and/or hardware that forms part of a larger system, such as, but not limited to, an IC, an SoC and so forth.

Figure 6:
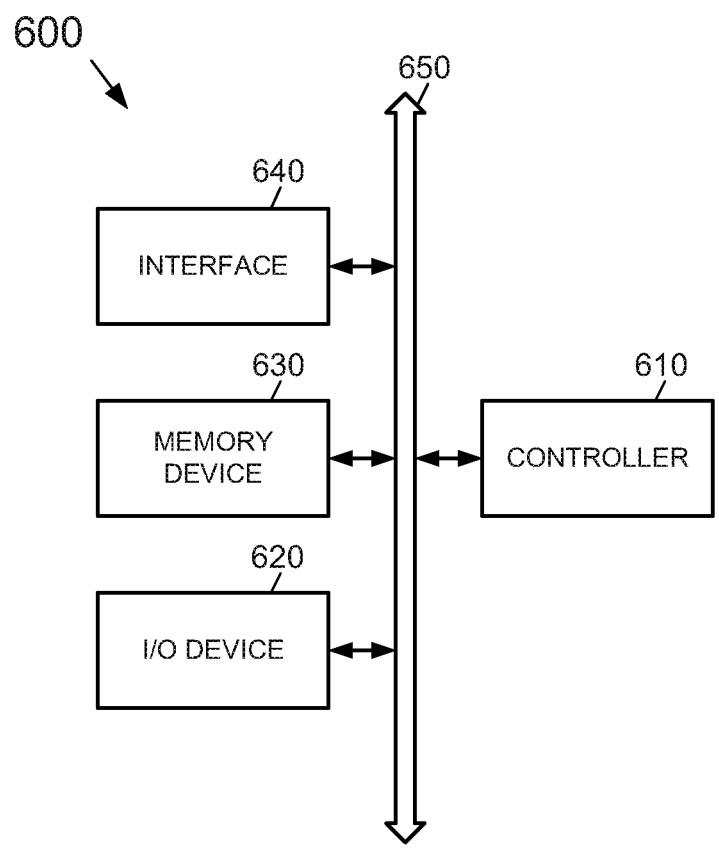
FIG. 6 depicts an electronic device that includes one or more integrated circuits forming a system that provides a convolutional layer using an input stride that is greater than 1 while the hardware performing the convolutional layer operates using an input stride of 1 according to the subject matter disclosed herein.

FIG. 6 depicts an electronic device 600 that includes one or more integrated circuits (chips) forming a system that provides a convolutional layer using an input stride that is greater than 1 while the hardware performing the convolutional layer operates using an input stride of 1 according to the subject matter disclosed herein. Electronic device 600 may be used in, but not limited to, a computing device, a personal digital assistant (PDA), a laptop computer, a mobile computer, a web tablet, a wireless phone, a cell phone, a smart phone, a digital music player, or a wireline or wireless electronic device. The electronic device 600 may include a controller 610, an input/output device 620 such as, but not limited to, a keypad, a keyboard, a display, a touch-screen display, a camera, and/or an image sensor, a memory 630, and an interface 640 that are coupled to each other through a bus 650. The controller 610 may include, for example, at least one microprocessor, at least one digital signal process, at least one microcontroller, or the like. The memory 630 may be configured to store a command code to be used by the controller 610 or a user data. Electronic device 600 and the various system components of electronic device 600 may form a system that provides a convolutional layer using an input stride that is greater than 1 while the hardware performing the convolutional layer operates using an input stride of 1 according to the subject matter disclosed herein. The interface 640 may be configured to include a wireless interface that is configured to transmit data to or receive data from a wireless communication network using a RF signal. The wireless interface 640 may include, for example, an antenna, a wireless transceiver and so on. The electronic system 600 also may be used in a communication interface protocol of a communication system, such as, but not limited to, Code Division Multiple Access (CDMA), Global System for Mobile Communications (GSM), North American Digital Communications (NADC), Extended Time Division Multiple Access (E-TDMA), Wideband CDMA (WCDMA), CDMA2000, Wi-Fi, Municipal Wi-Fi (Muni Wi-Fi), Bluetooth, Digital Enhanced Cordless Telecommunications (DECT), Wireless Universal Serial Bus (Wireless USB), Fast low-latency access with seamless handoff Orthogonal Frequency Division Multiplexing (Flash-OFDM), IEEE 802.20, General Packet Radio Service (GPRS), iBurst, Wireless Broadband (WiBro), WiMAX, WiMAX-Advanced, Universal Mobile Telecommunication Service-Time Division Duplex (UMTS-TDD), High Speed Packet Access (HSPA), Evolution Data Optimized (EVDO), Long Term Evolution-Advanced (LTE-Advanced), Multichannel Multipoint Distribution Service (MMDS), and so forth.

As will be recognized by those skilled in the art, the innovative concepts described herein can be modified and varied over a wide range of applications. Accordingly, the scope of claimed subject matter should not be limited to any of the specific exemplary teachings discussed above, but is instead defined by the following claims.

What is claimed is:

1. A system to form at least one output feature map (OFM) from at least one input feature map (IFM) at a convolutional layer in a neural network, the system comprising:
 a weight-kernel subdivider to subdivide each original weight kernel of a plurality of sets of original weight kernels based on a predetermined horizontal input stride and a predetermined vertical input stride to form a set of a plurality of sub-kernels for each set of original weight kernels, the plurality of sets of original weight kernels corresponding to a current convolutional layer of the neural network, the predetermined horizontal input stride being greater than 1, and the predetermined vertical input stride being greater than 1; and
 an IFM subdivider to subdivide each of a plurality of IFMs based on the predetermined horizontal input stride and the predetermined vertical input stride to form a plurality of sub-maps for each IFM of the plurality of IFMs, the plurality of IFMs corresponding to the current convolutional layer, and each sub-map corresponding to a sub-kernel in each set of the plurality of sub-kernels.

2. The system of claim 1, further comprising a convolver coupled to the weight-kernel subdivider and the IFM subdivider to convolve each sub-map by the corresponding sub-kernel for a set of original weight kernels using an input stride of 1 for each set of original weight kernels.

3. The system of claim 1, wherein a weight in a sub-kernel comprises a weight in the original weight kernel from which the sub-kernel was subdivided based on a modulo of the predetermined horizontal input stride and based on a modulo of the predetermined vertical input stride of a position of the weight in the original weight kernel.

4. The system of claim 1, wherein the predetermined horizontal input stride is 2 and the predetermined vertical input stride is 2, or
 wherein the predetermined horizontal input stride is 3 and the predetermined vertical input stride is 3.

5. The system of claim 1, wherein the predetermined horizontal input stride and the predetermined vertical input stride are equal to a predetermined second value,
wherein the weight-kernel subdivider to further subdivide each original weight kernel of a plurality of sets of original weight kernels by a square of the predetermined second value to form the set of a plurality of sub-kernels for each set of original weight kernels, and
wherein the IFM subdivider to further subdivide each of the plurality of IFMs based on the square of the predetermined second value to form the plurality of sub-maps for each IFM of the plurality of IFMs.

6. The system of claim 1, further comprising:
a domain converter coupled to the weight-kernel subdivider and the IFM subdivider to convert elements of each sub-map into a Winograd domain; and
a convolver coupled to an output of the domain converter, the convolver convolving each sub-map by the corresponding sub-kernel in the Winograd domain for a set of original weight kernels using a horizontal input stride of 1 and a vertical input stride of 1 for each set of original weight kernels.

7. A system to form at least one output feature map (OFM) from at least one input feature map (IFM) at a convolutional layer in a neural network, the system comprising:
a weight-kernel subdivider to increase a dimensionality of each set of a plurality of sets of original weight kernels by subdividing each original weight kernel based on a predetermined horizontal input stride and a predetermined vertical input stride to form a plurality of sub-kernels for each set of original weight kernels, the plurality of sets of original weight kernels corresponding to a current convolutional layer of the neural network, a dimension of each sub-kernel being less than a dimension of the original weight kernel from which the sub-kernel was subdivided, the predetermined horizontal input stride being greater than 1, and the predetermined vertical input stride being greater than 1; and
an IFM subdivider to increase a dimensionality of a plurality of IFMs by subdividing each IFM of the plurality of IFMs based on the predetermined horizontal input stride and the predetermined vertical input stride to form a plurality of sub-maps for each IFM, the plurality of IFMs corresponding to the current convolutional layer, each sub-map corresponding to a sub-kernel in each set of the plurality of sub-kernels, and a dimension of each sub-map being less than a dimension of the IFM was subdivided.

8. The system of claim 7, further comprising a convolver coupled to the weight-kernel subdivider and the IFM subdivider to convolve each sub-map by the corresponding sub-kernel for a set of original weight kernels using an input stride of 1 for each set of original weight kernels.

9. The system of claim 7, wherein a weight in a sub-kernel comprises a weight in the original weight kernel from which the sub-kernel was subdivided based on a modulo of the predetermined input horizontal stride and the predetermined vertical input stride of a position of the weight in the original weight kernel.

10. The system of claim 7, wherein the predetermined horizontal input stride is 2, and the predetermined vertical input stride is 2, or
wherein the predetermined horizontal input stride is 3, and the predetermined vertical input stride is 3.

11. The system of claim 7, wherein the predetermined horizontal input stride and the predetermined vertical input stride are equal to a predetermined second value,
wherein the weight-kernel subdivider to further subdivide each original weight kernel of a plurality of sets of original weight kernels by a square of the predetermined second value to form the set of a plurality of sub-kernels for each set of original weight kernels, and
wherein the IFM subdivider to further subdivide each of the plurality of IFMs based on the square of the predetermined second value to form the plurality of sub-maps for each IFM of the plurality of IFMs.

12. The system of claim 7, further comprising:
a domain converter coupled to the weight-kernel subdivider and the IFM subdivider to convert elements of each sub-map into a Winograd domain; and
a convolver coupled to an output of the domain converter, the convolver convolving each sub-map by the corresponding sub-kernel in the Winograd domain for a set of original weight kernels using a horizontal input stride of 1 and a vertical input stride of 1 for each set of original weight kernels.

13. A method to form at least one output feature map (OFM) from at least one input feature map (IFM) at a convolutional layer in a neural network, the method comprising:
subdividing each original weight kernel of a plurality of sets of original weight kernels based on a predetermined horizontal input stride and a predetermined vertical input stride to form a set of a plurality of sub-kernels for each original weight kernel in a set of original weight kernels, the plurality of sets of original weight kernels corresponding to a current convolutional layer of the neural network, the predetermined horizontal input stride being greater than 1, and the predetermined vertical input stride being greater than 1; and
subdividing each of a plurality of IFMs based on the predetermined horizontal input stride and the predetermined vertical input stride to form a plurality of sub-maps for each IFM of the plurality of IFMs, the plurality of IFMs corresponding to the current convolutional layer, and each sub-map corresponding to a sub-kernel in each set of the plurality of sub-kernels.

14. The method of claim 13, further comprising for each set of original weight kernels, convolving each sub-map by the corresponding sub-kernel using a horizontal input stride of 1 and a vertical input stride of 1.

15. The method of claim 13, wherein a weight in a sub-kernel comprises a weight in the original weight kernel from which the sub-kernel was subdivided based on a modulo of the predetermined horizontal input stride and on a modulo of the predetermined vertical input stride of a position of the weight in the original weight kernel.

16. The method of claim 13, wherein the predetermined horizontal input stride is 2 and the predetermined vertical input stride is 2, or
wherein the predetermined horizontal input stride is 3 and the predetermined vertical input stride is 3.

17. The method of claim 13, further comprising converting elements of each sub-map into a Winograd domain before convolving each sub-map.

* * * * *